(12) United States Patent
Tomita et al.

(10) Patent No.: US 12,305,253 B2
(45) Date of Patent: May 20, 2025

(54) ELECTRICAL STEEL SHEET AND METHOD FOR MANUFACTURING SAME

(71) Applicant: NIPPON STEEL CORPORATION, Tokyo (JP)

(72) Inventors: Miho Tomita, Tokyo (JP); Yoshiaki Natori, Tokyo (JP); Hiroyoshi Yashiki, Tokyo (JP); Hiroshi Fujimura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 779 days.

(21) Appl. No.: 17/441,084

(22) PCT Filed: Apr. 1, 2020

(86) PCT No.: PCT/JP2020/015111
§ 371 (c)(1),
(2) Date: Sep. 20, 2021

(87) PCT Pub. No.: WO2020/204107
PCT Pub. Date: Oct. 8, 2020

(65) Prior Publication Data
US 2022/0186336 A1 Jun. 16, 2022

(30) Foreign Application Priority Data
Apr. 3, 2019 (JP) ................. 2019-071186

(51) Int. Cl.
| | | |
|---|---|---|
| C21D 9/46 | (2006.01) |
| C21D 6/00 | (2006.01) |
| C21D 8/12 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/16 | (2006.01) |
| H01F 1/147 | (2006.01) |

(52) U.S. Cl.
CPC ............... *C21D 9/46* (2013.01); *C21D 6/001* (2013.01); *C21D 6/005* (2013.01); *C21D 6/008* (2013.01); *C21D 8/1222* (2013.01); *C21D 8/1233* (2013.01); *C21D 8/1266* (2013.01); *C21D 8/1272* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/16* (2013.01); *H01F 1/14775* (2013.01); *C22C 2202/02* (2013.01)

(58) Field of Classification Search
None
See application file for complete search history.

(56) References Cited

U.S. PATENT DOCUMENTS

| | | |
|---|---|---|
| 2015/0136278 A1 | 5/2015 | Nakanishi et al. |
| 2016/0196909 A1 | 7/2016 | Takenaka et al. |

FOREIGN PATENT DOCUMENTS

| | | |
|---|---|---|
| EP | 1 108 794 A1 | 6/2001 |
| EP | 3 162 907 A1 | 5/2017 |
| JP | 2017-145462 A | 8/2017 |
| JP | 2018-141206 A | 9/2018 |

*Primary Examiner* — Xiaowei Su
(74) *Attorney, Agent, or Firm* — Birch, Stewart, Kolasch & Birch, LLP

(57) ABSTRACT

This electrical steel sheet contains, as a chemical composition, by mass %, C: 0.0035% or less, Si: 2.00% to 3.50%, Mn: 2.00% to 5.00%, P: 0.050% or less, S: 0.0070% or less, Al: 0.15% or less, N: 0.0030% or less, Ni: 0% to 1.00%, Cu: 0% to 0.10%, and a remainder: Fe and impurities, in which an X-ray random intensity ratio in a {100} <011> crystal orientation on a sheet surface is 15.0 to 50.0, and magnetic flux densities in 0°, 22.5°, and 45° directions from a rolling direction each satisfy $[1.005 \times (B_{50}(0°)+B_{50}(45°))/2 \geq B_{50}(22.5°)]$.

4 Claims, No Drawings

ELECTRICAL STEEL SHEET AND METHOD FOR MANUFACTURING SAME

TECHNICAL FIELD OF THE INVENTION

The present invention relates to an electrical steel sheet and a method for manufacturing the same.

Priority is claimed on Japanese Patent Application No. 2019-71186, filed in Japan on Apr. 3, 2019, the content of which is incorporated herein by reference.

RELATED ART

In recent years, global environmental issues have been attracting attention, and a demand for energy-saving efforts has been further intensifying. Particularly, there has been a strong demand for an increase in the efficiency of electrical equipment. This also further intensifies a requirement for improvement in the magnetic characteristics of electrical steel sheets that are broadly used as iron core materials of motors, generators, and the like. Therefore, for electrical steel sheets that are used as cores of electrical equipment, there is a demand for a low iron loss and a high magnetic flux density.

In order to increase the magnetic flux densities of electrical steel sheets, a <100> orientation, which is the magnetization easy axis direction of iron, is desirably piled up in a specific direction. For example, Patent Document 1 discloses an electrical steel sheet having excellent magnetic characteristics and strength, in which the X-ray random intensity ratio in {100} <011> on the sheet surface of the steel sheet is 30 or more and 200 or less.

PRIOR ART DOCUMENT

Patent Document

[Patent Document 1] Japanese Unexamined Patent Application, First Publication No. 2017-145462

DISCLOSURE OF THE INVENTION

Problems to be Solved by the Invention

In the electrical steel sheet disclosed in Patent Document 1, the {100} <011> crystal orientation is piled up on the sheet surface of the steel sheet. That is, on the sheet surface of the steel sheet, the magnetization easy axis is piled up at an angle of 45° from a rolling direction RD. Therefore, the electrical steel sheet has excellent magnetic characteristics.

However, in the electrical steel sheet described in Patent Document 1, the magnetic characteristics are outstanding only in a 45° direction from the rolling direction RD, and the anisotropy is extremely strong. Actually, in a case where an electrical steel sheet is used as a core of electrical equipment, since a magnetic flux needs to flow along the shape of the core, the magnetic characteristics become important not only in the {100} <011> crystal orientation but also in the periphery thereof.

The present invention has been made to solve such a problem, and an object of the present invention is to provide an electrical steel sheet having excellent magnetic characteristics not only in the 45° degree from the rolling direction but also in the peripheral directions.

Means for Solving the Problem

The gist of the present invention is an electrical steel sheet and a method for manufacturing the same described below.

(1) An electrical steel sheet containing, as a chemical composition, by mass %:
C: 0.0035% or less,
Si: 2.00% to 3.50%,
Mn: 2.00% to 5.00%,
P: 0.050% or less,
S: 0.0070% or less,
Al: 0.15% or less,
N: 0.0030% or less,
Ni: 0% to 1.00%,
Cu: 0% to 0.10%, and
a remainder: Fe and impurities,
in which an X-ray random intensity ratio in a {100} <011> crystal orientation on a sheet surface is 15.0 to 50.0, and
magnetic flux densities in 0°, 22.5°, and 45° directions from a rolling direction each satisfy Expression (i).

$$1.005 \times (B_{50}(0°) + B_{50}(45°))/2 \leq B_{50}(22.5°) \qquad (i)$$

Here, the meaning of each symbol in Expression (i) is as follows.

$B_{50}$ (0°): A magnetic flux density (T) in the 0° direction from the rolling direction $B_{50}$ (22.5°): A magnetic flux density (T) in the 22.5° direction from the rolling direction $B_{50}$ (45°): A magnetic flux density (T) in the 45° direction from the rolling direction (2) The electrical steel sheet according to (1), in which a sheet thickness is 0.25 to 0.50 mm.

(3) A method for manufacturing an electrical steel sheet, the method including in the following order:
on a slab having a chemical composition of, by mass %:
C: 0.0035% or less,
Si: 2.00% to 3.50%,
Mn: 2.00% to 5.00%,
P: 0.050% or less,
S: 0.0070% or less,
Al: 0.15% or less,
N: 0.0030% or less,
Ni: 0% to 1.00%,
Cu: 0% to 0.10%, and
a remainder: Fe and impurities,
(a) a hot rolling step of heating the slab to 1000° C. to 1200° C., then, performing hot rolling under a condition where a final rolling temperature is within a temperature range of an $Ac_3$ transformation point or higher, and cooling the slab to a temperature of 600° C. or lower after completion of the hot rolling to 600° C. such that an average cooling rate reaches 50 to 150° C./s,
(b) a first cold rolling step of performing cold rolling at a rolling reduction of 80% to 92% without performing an annealing treatment,
(c) an intermediate annealing step of performing an annealing treatment at an intermediate annealing temperature within a range of 500° C. or higher and lower than an $Ac_1$ transformation point,
(d) a second cold rolling step of performing cold rolling at a rolling reduction of more than 15.0% and 20.0% or less, and
(e) a final annealing step of performing an annealing treatment at a final annealing temperature within a range of 500° C. or higher and lower than the $Ac_1$ transformation point.

(4) The method for manufacturing an electrical steel sheet according to (3), in which, in the final annealing step, a temperature rising rate up to the final annealing temperature is set to 0.1° C./s or faster and slower than 10.0° C./s, and a retention time at the final annealing temperature is set to 10 to 120 s.

Effects of the Invention

According to the present invention, an electrical steel sheet having excellent magnetic characteristics not only in the 45° direction from the rolling direction but also in the peripheral directions can be obtained.

EMBODIMENTS OF THE INVENTION

The present inventors performed studies regarding a method for obtaining an electrical steel sheet having excellent magnetic characteristics not only in a {100} <011> crystal orientation but also in the peripheral directions and, furthermore, having a sufficient magnetic flux density and a low iron loss within a high frequency region of 1000 Hz or higher. As a result, the following finding was obtained.

Cold rolling is performed on a hot-rolled steel sheet at a high reduction ratio in the same manner as in a conventional manufacturing method, thereby piling up a {100} <011> crystal orientation. After that, the cold rolled steel sheet is recrystallized by intermediate annealing to remove strain, and furthermore, cold rolling is performed at a relatively high rolling reduction, whereby, additionally, crystals rotate, and crystal grains directed to slightly deviate from the {100} <011> increase.

The present invention has been made based on the above-described finding. Hereinafter, each requirement of the present invention will be described in detail.

1. Chemical Composition

The reasons for limiting each element are as described below. It should be noted that, in the following description, "%" regarding contents means "mass %".

C: 0.0035% or Less

Carbon (C) is an impurity that is inevitably contained in the electrical steel sheet according to the present embodiment. That is, the C content is more than 0%. C forms a fine carbide. The fine carbide does not only inhibit the movement of magnetic domain walls, but also inhibit grain growth during manufacturing steps. This decreases the magnetic flux density or increases the iron loss. From this viewpoint, the C content is 0.0035% or less. The C content is preferably as low as possible. However, excessive reduction of the C content increases the manufacturing costs. Therefore, in the case of taking operation in industrial production into account, the lower limit of the C content is preferably 0.0001%, more preferably 0.0005%, and still more preferably 0.0010%.

Si: 2.00% to 3.50%

Silicon (Si) increases the electric resistance of steel and reduces the iron loss. When the Si content is less than 2.00%, this effect cannot be obtained. On the other hand, when the Si content exceeds 3.50%, the magnetic flux density of steel decreases. When the Si content exceeds 3.50%, furthermore, the cold workability deteriorates, and there is a case where cracks are generated in the steel sheet during cold rolling. Therefore, the Si content is 2.00% to 3.50%. The lower limit of the Si content is preferably 2.10% and more preferably 2.40%. The upper limit of the Si content is preferably 3.40% and more preferably 3.20%.

Mn: 2.00% to 5.00%

Manganese (Mn) increases the electric resistance of steel and reduces the iron loss. Furthermore, Mn lowers the $Ac_3$ transformation point and enables the refinement of crystal grains by phase transformation in the component system of the electrical steel sheet of the present embodiment. Therefore, in the electrical steel sheet after the end of the final manufacturing step, it is possible to increase the random intensity ratio in the {100} <011> crystal orientation on the sheet surface of the steel sheet. As described above, the Si content of the electrical steel sheet of the present embodiment is high. Si is an element that raises the $Ac_3$ transformation point. Therefore, in the present embodiment, an increase the Mn content lowers the $Ac_3$ point is lowered and enables phase transformation in a hot rolling step. When the Mn content is less than 2.00%, the above-described effect cannot be obtained. On the other hand, when the Mn content is too high, MnS is excessively generated, and the cold workability deteriorates. Therefore, the Mn content is 2.00% to 5.00%. The lower limit of the Mn content is preferably 2.20% and more preferably 2.40%. The upper limit of the Mn content is preferably 4.80% and more preferably 4.60%.

P: 0.050% or Less

Phosphorus (P) is an impurity that is inevitably contained in the electrical steel sheet according to the present embodiment. That is, the P content is more than 0%. P segregates in steel and degrades the workability of steel. From this viewpoint, the P content is set to 0.050% or less. The upper limit of the P content is preferably 0.040% and more preferably 0.030%. The P content is preferably as low as possible. However, excessive reduction of the P content increases the manufacturing costs. In the case of taking operation in industrial production into account, the lower limit of the P content is preferably 0.0001% and more preferably 0.0003%.

S: 0.0070% or Less

Sulfur (S) is an impurity that is inevitably contained in the electrical steel sheet according to the present embodiment. That is, the S content is more than 0%. S forms a sulfide such as MnS. The sulfide impedes the movement of magnetic domain walls and degrades the magnetic characteristics. Within the range of the chemical composition of the electrical steel sheet of the present invention, when the S content exceeds 0.0070%, the magnetic characteristics deteriorate due to the generated sulfide. That is, the magnetic flux density decreases, and the iron loss increases. Therefore, the S content is 0.0070% or less. The upper limit of the S content is preferably 0.0060% and more preferably 0.0050%. The S content is preferably as low as possible. However, excessive reduction of the S content increases the manufacturing costs. When industrial production is taken into account, the lower limit of the S content is preferably 0.0001% and more preferably 0.0003%.

Al: 0.15% or Less

Aluminum (Al) is a ferrite-stabilizing element. When the Al content exceeds 0.15%, the $Ac_3$ transformation point rises, and, within the range of the chemical composition of the electrical steel sheet of the present invention, the refinement of crystal grains by phase transformation is inhibited. As a result, in the electrical steel sheet after the end of the final manufacturing step, the random intensity ratio in the {100} <011> crystal orientation on the sheet surface of the steel sheet decreases. Therefore, the Al content is 0.15% or less. The upper limit of the Al content is preferably 0.10% and more preferably 0.05% or less. The Al content may be 0%. That is, the Al content is 0% to 0.15%. However, excessive reduction of the Al content increases the manufacturing costs. Therefore, in the case of taking operation in industrial production into account, the lower limit of the Al content is preferably 0.0001% and more preferably 0.0003%.

N: 0.0030% or Less

Nitrogen (N) is an impurity that is inevitably contained in the electrical steel sheet according to the present embodiment. That is, the N content is more than 0%. N forms a fine nitride. The fine nitride inhibits the movement of magnetic domain walls. Therefore, the magnetic flux density decreases, and the iron loss increases. Therefore, the N content is 0.0030% or less. The upper limit of the N content is preferably 0.0020% and more preferably 0.0010%. The N content is preferably as low as possible. However, excessive reduction of the N content increases the manufacturing costs. Therefore, when industrial production is taken into account, the preferable lower limit of the N content is 0.0001%.

Ni: 0% to 1.00%

Nickel (Ni) is an optional element and may not be contained. That is, the Ni content may be 0%. In a case where the electrical steel sheet according to the present embodiment contains Ni, similar to Mn, Ni increases the electric resistance of the steel sheet and reduces the iron loss. Furthermore, Ni is an element that lowers the $A_3$ transformation point and enables the refinement of crystal grains by phase transformation. However, when the Ni content is too high, the product cost increases because Ni is expensive. Therefore, the Ni content is 0% to 1.00%. The lower limit of the Ni content is preferably more than 0%, more preferably 0.10%, and still more preferably 0.20%. The upper limit of the Ni content is preferably 0.90% and more preferably 0.85%. It should be noted that, when the content is approximately 0.04%, Ni can be contained as an impurity in the electrical steel sheet.

Cu: 0% to 0.10%

Copper (Cu) is an optional element and may not be contained. That is, the Cu content may be 0%. In a case where the electrical steel sheet according to the present embodiment contains Cu, similar to Mn, Cu increases the electric resistance of the steel sheet and reduces the iron loss. Furthermore, Cu lowers the $A_3$ transformation point and enables the refinement of crystal grains by phase transformation. However, when the Cu content is too high, CuS is excessively generated, grain growth during final annealing is inhibited, and the iron loss deteriorates. Therefore, the Cu content is 0% to 0.10%. The lower limit of the Cu content is preferably more than 0%, more preferably 0.01%, and still more preferably 0.04%. The upper limit of the Cu content is preferably 0.09% and more preferably 0.08%. It should be noted that, when the content is approximately 0.04%, Cu can be contained as an impurity in the electrical steel sheet.

In the chemical composition of the electrical steel sheet of the present invention, the remainder is Fe and impurities. Here, the "impurities" mean components that are mixed in from a raw material such as ore or a scrap or due to a variety of factors in manufacturing steps at the time of industrially manufacturing steel and are allowed to an extent that the present invention is not adversely affected.

It should be noted that, as impurity elements, the Cr content and the Mo content are not particularly specified. In the electrical steel sheet according to the present invention, the effect of the present invention is not particularly affected when the amount of each of the elements is 0.2% or less.

O is also an impurity element and does not affect the effect of the present invention when the O content is within a range of 0.05% or less. Since O may be mixed in during an annealing step, the effect of the present invention is not particularly affected when the O content in the slab stage (that is, the ladle value) is within a range of 0.01% or less.

Impurities other than the above-described impurities are, for example, Ti, V, W, Nb, Zr, Ca, Mg, REM, Pb, Bi, As, B, and Se. These elements all suppress grain growth in some cases. The amount of each of the above-described elements is preferably 0.01% or less and more preferably 0.005% or less.

2. X-Ray Random Intensity on Sheet Surface of Electrical Steel Sheet

In the electrical steel sheet according to the present invention, the X-ray random intensity ratio in the {100} <011> crystal orientation on the sheet surface of the steel sheet is 15.0 to 50.0. Here, the sheet surface of the steel sheet means a surface that is parallel to the rolling direction and the sheet width direction of the steel sheet and a surface perpendicular to the sheet thickness direction of the steel sheet. In such a case, the integration degree of the <100> orientation, which is the magnetization easy axis, becomes sufficiently high in a direction at an angle of 45° with respect to a rolling direction RD on the sheet surface of the steel sheet.

When the X-ray random intensity ratio in the {100} <011> crystal orientation on the sheet surface of the steel sheet is less than 15.0, the integration degree of the magnetization easy axis in the direction at an angle of 45° with respect to the rolling direction RD is too low. In this case, a sufficient magnetic flux density cannot be obtained in the direction at an angle of 45° with respect to the rolling direction RD, and the iron loss also increases. On the other hand, when the X-ray random intensity ratio in the {100} <011> crystal orientation on the sheet surface of the steel sheet exceeds 50.0, the magnetic flux density is saturated in the electrical steel sheet having the above-described chemical composition.

Therefore, the X-ray random intensity ratio in the {100} <011> crystal orientation on the sheet surface of the steel sheet is 15.0 to 50.0. The lower limit of the X-ray random intensity ratio is preferably 17.0 and more preferably 20.0. The upper limit of the X-ray random intensity ratio is preferably 47.0 and more preferably 45.0.

The X-ray random intensity ratio in the {100} <011> crystal orientation on the sheet surface of the steel sheet is the ratio of the X-ray diffraction intensity in the {100} <011> crystal orientation of a measured electrical steel sheet sample to the X-ray diffraction intensity in the {100} <011> crystal orientation of a reference sample having no pile-up in a specific orientation (random sample).

The X-ray random intensity ratio in the {100} <011> crystal orientation on the sheet surface of the steel sheet can be measured by the following method. The X-ray random intensity ratio is obtained from an orientation distribution function (ODF) representing a three-dimensional texture that is calculated by the series expansion method based on the pole figures of {200}, {110}, {310}, and {211} of an α-Fe phase that are measured by the X-ray diffraction method. The measurement by the X-ray diffraction method is performed at an optional position between the sheet thickness/4 and the sheet thickness/2 of the electrical steel sheet. At this time, the measurement surface is finished by chemical polishing or the like so as to become smooth.

3. Magnetic Flux Density

As described above, in the electrical steel sheet of the present invention, subsequent to first cold rolling at a high rolling reduction, second cold rolling is performed, whereby a number of crystal grains directed to slightly deviate from the {100} <011> are included. Therefore, the magnetic flux density in a 22.5° direction from the rolling direction RD becomes relatively high.

Specifically, the magnetic flux densities in 0°, 22.5°, and 45° directions from the rolling direction RD of the steel sheet each satisfy Expression (i).

$$1.005 \times (B_{50}(0°) + B_{50}(45°))/2 \leq B_{50}(22.5°) \quad \text{(i)}$$

Here, the meaning of each symbol in the expression is as follows.

$B_{50}(0°)$: A magnetic flux density (T) in the 0° direction from the rolling direction $B_{50}(22.5°)$: A magnetic flux density (T) in the 22.5° direction from the rolling direction $B_{50}(45°)$: A magnetic flux density (T) in the 45° direction from the rolling direction When Expression (i) is satisfied, the anisotropy is appropriately relaxed, which makes it easy for magnetism to flow along the shape of a core of electrical equipment in the case of using the electrical steel sheet as the core.

In addition to satisfying Expression (i), the electrical steel sheet according to the present embodiment more preferably satisfies Expression (ii) below. This is because, when the electrical steel sheet according to the present embodiment satisfies Expression (ii), a magnetic flux concentrates in the teeth direction and the yoke direction of a divided core, and the leakage magnetic flux can be reduced.

$$B_{50}(45°) - B_{50}(0°) \geq 0.085T \quad \text{(ii)}$$

It should be noted that the meaning of each symbol in Expression (ii) is the same as that in Expression (i).

4. Sheet Thickness

In the present invention, the sheet thickness of the electrical steel sheet is not particularly limited. The preferable sheet thickness of the electrical steel sheet is 0.25 to 0.50 mm. Generally, as the sheet thickness becomes thinner, the iron loss becomes lower, but the magnetic flux density becomes lower. When the sheet thickness of the electrical steel sheet according to the present embodiment is 0.25 mm or more, the iron loss becomes lower, and the magnetic flux density becomes higher. On the other hand, when the sheet thickness is 0.50 mm or less, a low iron loss can be maintained. The preferable lower limit of the sheet thickness is 0.30 mm. In the electrical steel sheet of the present embodiment, even when the sheet thickness is as thick as 0.50 mm, a high magnetic flux density and a low iron loss can be obtained.

5. Uses

The electrical steel sheet according to the present invention is broadly applicable to uses where magnetic characteristics (a high magnetic flux density and a low iron loss) are required, and the following uses are exemplary examples. (A) Servomotors, stepping motors, and compressors that are used in electrical equipment. (B) Drive motors that are used in electric vehicles and hybrid vehicles. Here, the vehicle includes automobiles, motorcycles, railroads, and the like. (C) Generators. (D) Iron cores, choke coils, reactor (E) current sensors, and the like for a variety of uses.

The electrical steel sheet according to the present invention is also applicable to uses other than the above-described uses. The electrical steel sheet of the present invention is particularly preferable for uses as divided cores and more preferable for divided cores for drive motors of electric vehicles or hybrid vehicles that are applied to a high frequency region of 1000 Hz or higher.

6. Manufacturing Method

An example of a method for manufacturing an electrical steel sheet according to the present invention will be described. The method for manufacturing an electrical steel sheet includes (a) a hot rolling step, (b) a first cold rolling step, (c) an intermediate annealing step, (d) a second cold rolling step, and (e) a final annealing step in this order. Hereinafter, each step will be described in detail.

(a) Hot Rolling Step

In the hot rolling step, hot rolling is performed on a slab satisfying the above-described chemical composition to manufacture a steel sheet. The hot rolling step includes a heating step and a rolling step.

The slab is manufactured by a well-known method. For example, molten steel is manufactured with a converter, an electric furnace, or the like. The manufactured molten steel is secondarily refined with a degassing facility or the like to obtain molten steel having the above-described chemical composition. A slab is cast using the molten steel by the continuous casting method or the ingot-making method. The cast slab may be bloomed.

[Heating Step]

In the heating step, the slab having the above-described chemical composition is heated to 1000° C. to 1200° C. Specifically, the slab is placed in a heating furnace or a soaking furnace and heated in the furnace. The retention time at the above-described heating temperature in the heating furnace or the soaking furnace is, for example, 30 to 200 hours.

[Rolling Step]

In the rolling step, a plurality of passes of rolling are performed on the slab heated by the heating step to manufacture a steel sheet. Here, the "pass" means that the steel sheet passes through one rolling stand having a pair of work rolls and receives rolling. As the hot rolling, for example, a plurality of passes of rolling may be performed by performing tandem rolling using a tandem rolling mill including a plurality of rolling stands arranged in a row (each rolling stand has a pair of work rolls) or a plurality of passes of rolling may be performed by performing reverse rolling having a pair of work rolls. From the viewpoint of the productivity, it is preferable to perform a plurality of rolling passes using the tandem rolling mill.

The final rolling temperature in the rolling step is set to the $Ac_3$ transformation point or higher. In addition, after the completion of the rolling, cooling is performed to a temperature of 600° C. or lower such that the average cooling rate up to 600° C. reaches 50 to 150° C./s. The cooling method after the temperature of the steel sheet reaches 600° C. is not particularly limited. The temperature of the steel sheet means the surface temperature (° C.) of the steel sheet.

Here, the final rolling temperature means the surface temperature (° C.) of the steel sheet on the exit side of the rolling stand where the final pass of rolling is performed in the rolling step during the hot rolling step. The final rolling temperature can be measured with, for example, a thermometer installed on the exit side of the rolling stand where the final pass of rolling is performed. It should be noted that the final rolling temperature means, for example, in the case of equally dividing the total length of the steel sheet into 10 sections in the rolling direction, the average value of temperature measurement results in the individual sections excluding the front end section and the rear end section.

In addition, the average cooling rate up to 600° C. is obtained by the following method. A steel sheet having the above-described chemical composition is used as a sample steel sheet, and the surface temperature is measured with a radiation-type thermometer, thereby measuring the time taken to cool the steel sheet to 600° C. from the completion of rolling. The average cooling rate is obtained based on the measured time.

(b) First Cold Rolling Step

The cold rolling step is performed on the steel sheet manufactured by the hot rolling step without performing an annealing step. As cold rolling, for example, a plurality of passes of rolling may be performed by performing tandem rolling using a tandem rolling mill including a plurality of rolling stands arranged in a row (each rolling stand has a pair of work rolls). In addition, one pass or a plurality of passes of rolling may be performed by performing reverse rolling with a Sendzimir rolling mill or the like having a pair of work rolls. From the viewpoint of the productivity, it is preferable to perform a plurality of passes of rolling using the tandem rolling mill.

In the first cold rolling step, cold rolling is performed without performing an annealing treatment in the middle of the cold rolling. For example, in the case of performing a plurality of passes of cold rolling by performing reverse rolling, a plurality of passes of cold rolling are performed without performing an annealing treatment between the passes of the cold rolling. It should be noted that only one pass of cold rolling may be performed using a reverse-type rolling mill. In addition, in the case of performing cold rolling using a tandem-type rolling mill, a plurality of passes (passes in individual rolling stands) of cold rolling are continuously performed.

The rolling reduction in the first cold rolling step is set to 80% to 92%. Here, the rolling reduction in the cold rolling step is defined as described below.

Rolling reduction (%)=(1−sheet thickness of steel sheet after final pass of rolling in cold rolling step/sheet thickness of steel sheet before first pass of cold rolling in cold rolling step)×100

It should be noted that an annealing step after the hot rolling step before the cold rolling step is skipped. In the chemical composition of the electrical steel sheet according to the present embodiment, the Mn content is high as described above. Therefore, when annealing of a hot rolled sheet that has been performed on conventional electrical steel sheets is performed, Mn segregates at grain boundaries, which significantly degrades the workability of the steel sheet (hot-rolled steel sheet) after the hot rolling step. It should be noted that the annealing treatment mentioned herein means, for example, a heat treatment at 300° C. or higher.

(c) Intermediate Annealing Step

In the intermediate annealing step, an annealing treatment is performed on the steel sheet after the first cold rolling step at an intermediate annealing temperature in a range of 500° C. or higher and lower than the $Ac_1$ transformation point.

When the intermediate annealing temperature is lower than 500° C., it is not possible to sufficiently reduce strain introduced by the cold rolling step. In this case, the integration degree of the {100} <011> crystal orientation decreases. As a result, the X-ray random intensity ratio of the electrical steel sheet in the {100} <011> crystal orientation on the sheet surface of the steel sheet is not within the range of 15.0 to 50.0. On the other hand, when the intermediate annealing temperature exceeds the $Ac_1$ point, a part of the structure of the steel sheet is transformed into austenite, and the crystal orientation is randomized. The lower limit of the intermediate annealing temperature is preferably 550° C. and more preferably 570° C.

Here, the intermediate annealing temperature is defined as the sheet temperature (the temperature of the surface of the steel sheet) in the vicinity of the extraction port of an annealing furnace. The sheet temperature in the annealing furnace can be measured with a thermometer disposed in the extraction port of the annealing furnace.

It should be noted that the retention time at the intermediate annealing temperature in the intermediate annealing step may be a time well known to those skilled in the art. The retention time at the intermediate annealing temperature is, for example, 1 to 30 s. However, the retention time at the intermediate annealing temperature is not limited thereto. In addition, the temperature rising rate up to the intermediate annealing temperature may also be a well-known condition. The temperature rising rate up to the intermediate annealing temperature is, for example, 10.0 to 20.0° C./s. However, the temperature rising rate up to the intermediate annealing temperature is not limited thereto.

The atmosphere during intermediate annealing is not particularly limited; however, as the atmosphere during intermediate annealing, for example, an atmospheric gas (dried) containing 20% of $H_2$ with the remainder of $N_2$ is used. The cooling rate of the steel sheet after the intermediate annealing is not particularly limited. The cooling rate is, for example, 5.0 to 50.0° C./s.

(d) Second Cold Rolling Step

A second cold rolling step is performed on the steel sheet after the completion of the intermediate annealing step. Specifically, rolling (cold rolling) is performed on the steel sheet after the intermediate annealing step at normal temperature in the air. For the cold rolling herein, for example, a reverse rolling mill represented by the above-described Sendzimir rolling mill or a tandem rolling mill is used.

In the second cold rolling step, cold rolling is performed without performing an annealing treatment in the middle of the cold rolling. For example, in the case of performing a plurality of passes of cold rolling by performing reverse rolling, a plurality of passes of cold rolling are performed without performing an annealing treatment between the passes of the cold rolling. It should be noted that only one pass of cold rolling may be performed using a reverse-type rolling mill. In addition, in the case of performing cold rolling using a tandem-type rolling mill, a plurality of passes (passes in individual rolling stands) of cold rolling are continuously performed.

The rolling reduction in the second cold rolling step is set to more than 15.0% and 20.0% or less. The preferable lower limit of the rolling reduction in the second cold rolling step is 17.0%. Here, the rolling reduction in the second cold rolling step is defined as described below.

Rolling reduction (%)=(1−sheet thickness of steel sheet after final pass of rolling/sheet thickness of steel sheet before first pass of cold rolling)×100

The number of passes of the cold rolling in the second cold rolling step may be only one pass (that is, only one time of rolling) or may be a plurality of passes of rolling.

As described above, after strain is introduced into the steel sheet by the hot rolling step and the first cold rolling step, the strain introduced into the steel sheet is reduced once by the intermediate annealing step. In addition, the second cold rolling step is performed. Therefore, additionally, crystals rotate, and crystal grains directed to slightly deviate from the {100} <011> increase. As a result, the magnetic flux density in the 22.5° direction from the rolling direction RD improves, and the anisotropy is appropriately relaxed.

(e) Final Annealing Step

In the final annealing step, an annealing treatment is performed on the steel sheet after the second cold rolling step at a final annealing temperature in a range of 500° C. or higher and lower than the $Ac_1$ transformation point.

When the final annealing temperature is lower than 500° C., the grain growth of {100} <011> crystal orientation grains does not sufficiently occur. As a result, the X-ray random intensity ratio of the electrical steel sheet in the {100} <011> crystal orientation on the sheet surface of the steel sheet is not within the range of 15.0 to 50.0. On the other hand, when the final annealing temperature exceeds the $Ac_1$ point, a part of the structure of the steel sheet is transformation into austenite. As a result, the X-ray random intensity ratio of the electrical steel sheet in the {100} <011> crystal orientation on the sheet surface of the steel sheet is not within the range of 15.0 to 50.0. The lower limit of the final annealing temperature is preferably 550° C. and more preferably 570° C.

Here, the final annealing temperature is defined as the sheet temperature (the temperature of the surface of the steel sheet) in the vicinity of the extraction port of an annealing furnace. The furnace temperature in the annealing furnace can be measured with a thermometer disposed in the extraction port of the annealing furnace.

It should be noted that the temperature rising rate up to the final annealing temperature in the final annealing step may be a temperature rising rate well known to those skilled in the art, and the retention time at the final annealing temperature may also be a time well known to those skilled in the art.

The atmosphere in the final annealing step is not particularly limited. As the atmosphere in the final annealing step, for example, an atmospheric gas (dried) containing 20% of $H_2$ with the remainder of $N_2$ is used. The cooling rate of the steel sheet after the final annealing is not particularly limited. The cooling rate is, for example, 5 to 20° C./s.

The preferable retention time at the final annealing temperature in the final annealing step is 10 to 120 s. When the retention time is 10 to 120 s, the integration degree of the {100} <011> crystal orientation increases. The lower limit of the retention time is more preferably 12 s and more preferably 15 s. The upper limit of the retention time is more preferably 100 s and more preferably 90 s.

Here, the retention time means the retention time after the temperature of the steel sheet reaches the final annealing temperature.

The preferable temperature rising rate up to the final annealing temperature in the final annealing step is set to 0.1° C./s or faster and slower than 10.0° C./s. When the temperature rising rate is 0.1° C./s or faster and slower than 10.0° C./s, the integration degree of the {100} <011> crystal orientation increases.

The temperature rising rate is obtained by the following method. A thermocouple is attached to a steel sheet that has the above-described chemical composition and is obtained by performing the hot rolling step through the second cold rolling step, thereby producing a sample steel sheet. The temperature of the sample steel sheet to which the thermocouple is attached is raised, and the time taken for the sample steel sheet to reach the final annealing temperature from the beginning of the temperature rise is measured. The temperature rising rate is obtained based on the measured time.

The method for manufacturing an electrical steel sheet according to the present invention is not limited to the above-described manufacturing steps.

For example, among the above-described manufacturing steps, after the hot rolling step and before the cold rolling step, a shot blasting step and/or a pickling step may be performed. In the shot blasting step, shot blasting is performed on the steel sheet after the hot rolling step, thereby fracturing and removing scale that is formed on the surface of the steel sheet after the hot rolling step. In the pickling step, a pickling treatment is performed on the steel sheet after the hot rolling step. In the pickling treatment, for example, a hydrochloric acid aqueous solution is used as a pickling bath.

Pickling removes the scale that is formed on the surface of the steel sheet. After the hot rolling step and before the cold rolling step, the pickling step may be performed after the shot blasting step is performed. In addition, after the hot rolling step and before the cold rolling step, the shot blasting step may not be performed after the pickling step is performed. After the hot rolling step and before the cold rolling step, the shot blasting step may be performed and the pickling step may not be performed. It should be noted that the shot blasting step and the pickling step are optional steps. Therefore, after the hot rolling step and before the cold rolling step, neither the shot blasting step nor the pickling step may be performed.

In the method for manufacturing an electrical steel sheet according to the present invention, furthermore, a coating step may be performed after the final annealing step. In the coating step, the surface of the steel sheet after the final annealing step is coated with an insulating coating.

The type of the insulating coating is not particularly limited. The insulating coating may be an organic component or an inorganic component, and the insulating coating may contain an organic component and an inorganic component. Examples of the inorganic component include dichromatic acid-boric acid-based components, phosphoric acid-based components, silica-based components, and the like. The organic component is, for example, an ordinary acrylic, acrylic styrene-based, acrylic silicon-based, silicon-based, polyester-based, epoxy-based, or fluorine-based resin. In the case of taking coatability into account, the preferable resin is an emulsion-type resin. An insulating coating that exhibits an adhesive capability by heating and/or pressurizing may be provided. The insulating coating having an adhesive capability is, for example, an acrylic, phenolic, epoxy-based, or melamine-based resin.

It should be noted that the coating step is an optional step. Therefore, after the final annealing step, the coating step may not be performed.

Hereinafter, the present invention will be more specifically described with examples, but the present invention is not limited to these examples.

EXAMPLES

Slabs having a chemical composition in Table 1 were heated to 1150° C. and then hot-rolled under conditions shown in Table 2 to manufacture hot-rolled steel sheets having a sheet thickness of 2.0 mm.

TABLE 1

| Steel type | Chemical composition (mass %, remainder: Fe and impurity) | | | | | | | | | Ac₁ point (° C.) | Ac₃ point (° C.) |
|---|---|---|---|---|---|---|---|---|---|---|---|
| | C | Si | Mn | P | S | Al | N | Ni | Cu | | |
| A | 0.0015 | 2.47 | 3.06 | 0.018 | 0.0022 | 0.05 | 0.0018 | 0.0009 | 0.0022 | 878 | 896 |
| B | 0.0018 | 3.12 | 3.76 | 0.011 | 0.0016 | 0.02 | 0.0008 | 0.0018 | 0.0016 | 894 | 916 |
| C | 0.0016 | 2.38 | 4.17 | 0.009 | 0.0025 | 0.01 | 0.0010 | 0.0011 | 0.0057 | 806 | 861 |
| D | 0.0015 | 2.11 | 2.57 | 0.010 | 0.0021 | 0.03 | 0.0016 | 0.0063 | 0.0014 | 903 | 924 |
| E | 0.0012 | 2.84 | 3.49 | 0.008 | 0.0026 | 0.02 | 0.0019 | 0.2380 | 0.0019 | 885 | 900 |
| F | 0.0017 | 2.09 | 3.05 | 0.009 | 0.0011 | 0.04 | 0.0012 | 0.0024 | 0.0750 | 912 | 933 |
| G | 0.0018 | 2.62 | 3.28 | 0.010 | 0.0015 | 0.01 | 0.0010 | 0.0510 | 0.0660 | 842 | 905 |
| H | 0.0015 | 3.30 | 3.05 | 0.027 | 0.0037 | 0.08 | 0.0022 | 0.8400 | 0.0057 | 945 | 1003 |
| I | 0.0013 | 2.74 | 3.71 | 0.013 | 0.0019 | 0.05 | 0.0015 | 0.0055 | 0.0130 | 876 | 935 |
| J | 0.0018 | 2.42 | 1.83 | 0.010 | 0.0022 | 0.01 | 0.0011 | 0.0016 | 0.0026 | 923 | 941 |
| K | 0.0017 | 2.18 | 5.21 | 0.009 | 0.0028 | 0.03 | 0.0008 | 0.0021 | 0.0030 | 754 | 807 |
| L | 0.0015 | 1.89 | 2.74 | 0.017 | 0.0025 | 0.02 | 0.0012 | 0.0013 | 0.0041 | 865 | 878 |
| M | 0.0016 | 3.66 | 2.81 | 0.011 | 0.0026 | 0.03 | 0.0012 | 0.0008 | 0.0010 | — | — |
| N | 0.0032 | 3.22 | 2.95 | 0.025 | 0.0018 | 0.08 | 0.0017 | 0.0012 | 0.0018 | 973 | 996 |
| O | 0.0018 | 2.94 | 4.82 | 0.019 | 0.0009 | 0.04 | 0.0013 | 0.0009 | 0.0019 | 761 | 815 |
| P | 0.0014 | 2.68 | 3.45 | 0.017 | 0.0012 | 0.14 | 0.0019 | 0.0004 | 0.0005 | 804 | 872 |

TABLE 2

| Test No. | Steel type | Hot rolling step | | | | First cold rolling step | Intermediate annealing step | Second cold rolling step | Final annealing step | Note |
|---|---|---|---|---|---|---|---|---|---|---|
| | | Final rolling temperature (° C.) | Ac₃ (° C.) | Cooling rate (° C./s) | Annealing step | Rolling reduction (%) | Annealing temperature (° C.) | Rolling reduction (%) | Annealing temperature (° C.) | |
| 1 | A | 923 | 896 | 85 | Absent | 85.0 | 700 | 18.0 | 850 | Present Invention Example |
| 2 | B | 947 | 916 | 86 | Absent | 85.0 | 700 | 18.0 | 850 | |
| 3 | C | 928 | 861 | 92 | Absent | 85.0 | 700 | 18.0 | 780 | |
| 4 | D | 951 | 924 | 88 | Absent | 83.0 | 700 | 18.0 | 880 | |
| 5 | E | 934 | 900 | 89 | Absent | 83.0 | 650 | 20.0 | 800 | |
| 6 | F | 987 | 933 | 91 | Absent | 83.0 | 650 | 20.0 | 880 | |
| 7 | G | 952 | 905 | 112 | Absent | 80.0 | 650 | 20.0 | 800 | |
| 8 | H | 1023 | 1003 | 124 | Absent | 80.0 | 650 | 20.0 | 880 | |
| 9 | I | 985 | 935 | 108 | Absent | 80.0 | 800 | 17.0 | 780 | |
| 10 | C | 908 | 861 | 117 | Absent | 87.0 | 800 | 17.0 | 780 | |
| 11 | D | 971 | 924 | 120 | Absent | 87.0 | 800 | 17.0 | 850 | |
| 12 | J | 969 | 941 | 114 | Absent | 87.0 | 800 | 17.0 | 850 | Comparative Example |
| 13 | K | 853 | 807 | 109 | Absent | — | — | — | — | |
| 14 | L | 907 | 878 | 68 | Absent | 85.0 | 550 | 17.0 | 825 | |
| 15 | M | 931 | — | 68 | Absent | 85.0 | 550 | 17.0 | 880 | |
| 16 | A | 862 | 896 | 61 | Absent | 80.0 | 550 | 17.0 | 825 | |
| 17 | B | 962 | 916 | 39 | Absent | 80.0 | 550 | 17.0 | 825 | |
| 18 | A | 927 | 896 | 161 | Absent | 80.0 | 850 | 16.0 | 825 | |
| 19 | B | 948 | 916 | 124 | Absent | 78.0 | 850 | 16.0 | 825 | |
| 20 | A | 936 | 896 | 118 | Absent | 94.0 | 850 | 16.0 | 825 | |
| 21 | B | 958 | 916 | 114 | Absent | 83.0 | 450 | 16.0 | 825 | |
| 22 | A | 933 | 896 | 114 | Absent | 83.0 | 900 | 16.0 | 825 | |
| 23 | B | 961 | 916 | 117 | Absent | 83.0 | 825 | 14.0 | 825 | |
| 24 | B | 946 | 896 | 135 | Absent | 85 | 825 | 22.0 | 825 | |
| 25 | A | 944 | 896 | 112 | Absent | 90.0 | 825 | 19.0 | 480 | |
| 26 | B | 957 | 916 | 111 | Absent | 90.0 | 825 | 19.0 | 925 | |
| 27 | A | 939 | 896 | 116 | Present | — | — | — | — | |
| 28 | N | 1012 | 996 | 78 | Absent | 87.0 | 750 | 18.0 | 750 | Present Invention Example |
| 29 | O | 862 | 815 | 96 | Absent | 87.0 | 750 | 18.0 | 750 | |
| 30 | P | 908 | 872 | 84 | Absent | 87.0 | 750 | 18.0 | 750 | |

[Evaluation Tests]

The following evaluation tests were performed on an electrical steel sheet of each steel number.

[Test for Measuring X-Ray Random Intensity in {100} <110> Crystal Orientation]

A sample was taken from the steel sheet of each test number, and the surface was mirror-polished. From the mirror-polished region, an optional region where the measurement intervals of pixels were ⅕ or less of the average grain diameter and 5000 or more crystal grains could be measured was selected. An EBSD measurement was performed in the selected region to obtain the pole figures of {200}, {110}, {310}, and {211}. An ODF distribution representing a three-dimensional texture that was calculated by the series expansion method was obtained using these pole figures. From the obtained ODF, the X-ray random intensity ratio in the {100} <011> crystal orientation was obtained.

[Test for Measuring Magnetic Flux Density]

A 55 mm×55 mm single sheet test piece was produced from the electrical steel sheet of each test number by punching. The magnetic flux densities $B_{50}$ (0°), $B_{50}$ (22.5°), and $B_{50}$ (45°) in 0°, 22.5°, and 45° directions from a rolling direction RD were each measured by the above-described method using a single sheet magnetic measuring instrument. The magnetic field during the measurement was set to 5000 A/m.

[Iron Loss at 1000 Hz $W_{10/1000}$]

A 55 mm×55 mm single sheet test piece was produced from the electrical steel sheet of each test number by punching. The iron loss $W_{10/1000}$ (W/kg) of the single sheet test piece magnetized at a frequency of 1000 Hz and a maximum magnetic flux density of 1.0 T was measured using the single sheet magnetic measuring instrument.

[Evaluation Results]

The evaluation results are summarized in Table 3. It should be noted that, as a result of measuring the chemical compositions of the manufactured electrical steel sheets, it was found that the electrical steel sheet of each steel number had the same chemical composition as the chemical composition shown in Table 1.

the experiment. In addition, since the Si content was excessive and deviated from the chemical composition of the α-γ transformation system in Test No. 15, the {100} <011> crystal orientation did not develop.

Since the final rolling temperature was low in Test No. 16, the cooling rate was too slow in Test No. 17, and the cooling rate was too fast in Test No. 18, the {100} <011> crystal orientation did not develop. Since the first cold rolling ratio was too low in Test No. 19, and, conversely, the first cold rolling ratio was too high in Test No. 20, consequently, the magnetic flux densities decreased as a whole in both cases. Similarly, since the intermediate annealing temperature was too low in Test No. 21, and, conversely, the intermediate annealing temperature was too high in Test No. 22, consequently, the magnetic flux densities decreased as a whole in both cases.

In Test No. 23, the iron loss and the magnetic flux density were excellent, but the second cold rolling ratio was low, and thus the anisotropy was not relaxed. On the other hand, in

TABLE 3

| Test No. | Steel type | {100} <110> integration degree X-ray random intensity ratio | Magnetic flux density | | | | | Iron loss $W_{10/1000}$ (W/kg) | Note |
|---|---|---|---|---|---|---|---|---|---|
| | | | $B_{50}$ (0°) (T) | $B_{50}$ (22.5°) (T) | $B_{50}$ (45°) (T) | Value of left side of Expression (i)* | Whether or not satisfying Expression (i) | | |
| 1 | A | 31 | 1.594 | 1.728 | 1.826 | 1.719 | OK | 42 | Present |
| 2 | B | 36 | 1.590 | 1.727 | 1.836 | 1.722 | OK | 41 | Invention |
| 3 | C | 28 | 1.590 | 1.719 | 1.829 | 1.718 | OK | 40 | Example |
| 4 | D | 33 | 1.577 | 1.716 | 1.813 | 1.703 | OK | 45 | |
| 5 | E | 31 | 1.576 | 1.718 | 1.816 | 1.704 | OK | 48 | |
| 6 | F | 25 | 1.579 | 1.711 | 1.814 | 1.705 | OK | 41 | |
| 7 | G | 27 | 1.568 | 1.720 | 1.843 | 1.714 | OK | 46 | |
| 8 | H | 46 | 1.566 | 1.691 | 1.766 | 1.674 | OK | 42 | |
| 9 | I | 38 | 1.603 | 1.715 | 1.801 | 1.711 | OK | 43 | |
| 10 | C | 32 | 1.594 | 1.721 | 1.824 | 1.718 | OK | 48 | |
| 11 | D | 26 | 1.606 | 1.729 | 1.831 | 1.727 | OK | 49 | |
| 12 | J | 11 | 1.623 | 1.650 | 1.671 | 1.655 | NG | 59 | Comparative |
| 13 | K | — | — | — | — | — | NG | — | Example |
| 14 | E | 6 | 1.624 | 1.647 | 1.673 | 1.657 | NG | 60 | |
| 15 | M | 10 | 1.630 | 1.649 | 1.680 | 1.663 | NG | 48 | |
| 16 | A | 6 | 1.625 | 1.670 | 1.701 | 1.671 | NG | 56 | |
| 17 | B | 7 | 1.631 | 1.653 | 1.686 | 1.667 | NG | 66 | |
| 18 | A | 6 | 1.624 | 1.671 | 1.700 | 1.670 | OK | 58 | |
| 19 | B | 6 | 1.587 | 1.634 | 1.669 | 1.636 | NG | 62 | |
| 20 | A | 11 | 1.573 | 1.658 | 1.729 | 1.659 | NG | 66 | |
| 21 | B | 7 | 1.623 | 1.665 | 1.710 | 1.675 | NG | 59 | |
| 22 | A | 8 | 1.635 | 1.664 | 1.688 | 1.670 | NG | 60 | |
| 23 | B | 38 | 1.618 | 1.705 | 1.809 | 1.722 | NG | 47 | |
| 24 | B | 12 | 1.627 | 1.652 | 1.678 | 1.661 | NG | 48 | |
| 25 | A | 25 | 1.602 | 1.664 | 1.811 | 1.715 | NG | 73 | |
| 26 | B | 4 | 1.626 | 1.658 | 1.683 | 1.663 | NG | 60 | |
| 27 | A | — | — | — | — | — | NG | — | |
| 28 | N | 46 | 1.541 | 1.788 | 1.819 | 1.688 | OK | 42 | Present |
| 29 | O | 23 | 1.552 | 1.756 | 1.800 | 1.684 | OK | 41 | Invention |
| 30 | P | 39 | 1.560 | 1.722 | 1.783 | 1.680 | OK | 43 | Example |

*$1.005 \times (B_{50}(0°) + B_{50}(45°))/2 \leq B_{50}(22.5°) \ldots$ (i)

As shown in Table 3, in Test Nos. 1 to 11 and 28 to 30 that satisfied the specifications of the present invention, it was found that the iron losses and the magnetic flux densities were excellent. In addition, the results show that the magnetic characteristics were excellent not only in the {100} <011> crystal orientation but also in the periphery thereof.

In contrast, since the Mn content was less than the specified value in Test No. 12, and the Si content was less than the specified value in Test No. 14, the {100} <011> crystal orientation did not develop. Since the Mn content was excessive in Test No. 13, the workability deteriorated and cracks were generated after cold rolling, which stopped Test No. 24, since the second cold rolling ratio was too high, the deviation from the {100} <011> crystal orientation became large, and consequently, the magnetic flux density decreased as a whole.

In Test No. 25, since the final annealing temperature was too low, consequently, grains did not grow, and the anisotropy was too strong. On the other hand, in Test No. 26, since the final annealing temperature was too high, α-γ transformation occurred and the structure was randomized, and thus, consequently, the magnetic flux density decreased as a whole. Furthermore, in Test No. 27, since annealing was not performed on the hot rolled sheet, Mn segregated at grain boundaries and cracks were generated after cold rolling, which stopped the experiment.

INDUSTRIAL APPLICABILITY

As described above, according to the present invention, an electrical steel sheet having excellent magnetic characteristics not only in a 45° direction from the rolling direction but also in the peripheral directions can be obtained.

The invention claimed is:

1. An electrical steel sheet comprising, as a chemical composition, by mass %:
C: 0.0035% or less,
Si: 2.00% to 3.50%,
Mn: 2.00% to 5.00%,
P: 0.050% or less,
S: 0.0070% or less,
Al: 0.15% or less,
N: 0.0030% or less,
Ni: 0% to 1.00%,
Cu: 0% to 0.10%, and
a remainder: Fe and impurities,
an X-ray random intensity ratio in a {100} <011> crystal orientation on a sheet surface is 15.0 to 50.0, wherein the sheet surface is a surface that is parallel to a rolling direction and the sheet width direction of the steel sheet and a surface perpendicular to the sheet thickness direction of the steel sheet, and
wherein the random intensity ratio is a ratio of an X-ray diffract on intensity in the {100} <011> crystal orientation of the electrical steel sheet to an X-ray diffraction intensity in the {100} <011> crystal orientation of a reference sample having no pile up in a specific orientation, and
magnetic flux densities in 0°, 22.5°, and 45° directions from a rolling direction each satisfy Expression (i), $$1.005 \times (B_{50}(0°) + B_{50}(45°))/2 \leq B_{50}(22.5°) \qquad (i)$$

here, the meaning of each symbol in Expression (i) is as follows:
$B_{50}$ (0°): a magnetic flux density (T) in the 0° direction from the rolling direction,
$B_{50}$ (22.5°): a magnetic flux density (T) in the 22.5° direction from the rolling direction, and
$B_{50}$ (45°): a magnetic flux density (T) in the 45° direction from the rolling direction.

2. The electrical steel sheet according to claim 1, wherein a sheet thickness is 0.25 to 0.50 mm.

3. A method for manufacturing as the electrical steel sheet according to claim 1, the method comprising in the following order:
on a slab having a chemical composition of, by mass %:
C: 0.0035% or less,
Si: 2.00% to 3.50%,
Mn: 2.00% to 5.00%,
P: 0.050% or less,
S: 0.0070% or less,
Al: 0.15% or less,
N: 0.0030% or less,
Ni: 0% to 1.00%,
Cu: 0% to 0.10%, and
a remainder: Fe and impurities,
(a) heating the slab to 1000° C. to 1200° C., then, performing hot rolling under a condition where a final rolling temperature is within a temperature range of an $Ac_3$ transformation point or higher, and cooling the slab to a temperature of 600° C. or lower after completion of the hot rolling to 600° C. such that an average cooling rate reaches 50 to 150° C./s,
(b) performing first cold rolling at a rolling reduction of 80% to 92% without performing an annealing treatment,
(c) performing an intermediate annealing treatment at an intermediate annealing temperature within a range of 500° C. or higher and lower than an $Ac_1$ transformation point,
(d) performing second cold rolling at a rolling reduction of more than 15.0% and 20.0% or less, and
(e) performing a final annealing treatment at a final annealing temperature within a range of 500° C. or higher and lower than the $Ac_1$ transformation point.

4. The method for manufacturing an electrical steel sheet according to claim 3,
wherein, in the final annealing treatment, a temperature rising rate up to the final annealing temperature is set to 0.1° C./s or faster and slower than 10.0° C./s, and a retention time at the final annealing temperature is set to 10 to 120 s.

* * * * *